United States Patent Office 3,257,371
Patented June 21, 1966

3,257,371
PROCESS OF PREPARING LINEAR POLYMERS
OF α-OLEFINES
Edgar Maurer, Im Lagi 16, Kusnacht, near
Zurich, Switzerland
No Drawing. Filed July 9, 1962, Ser. No. 208,635
Claims priority, application Switzerland, July 11, 1961,
8,145/61
11 Claims. (Cl. 260—93.7)

This invention relates to the preparation of stereospecific polymers. More particularly, the invention relates to a process for preparing highly crystalline stereospecific olefin polymers of high molecular weight.

Various catalysts for the polymerization of ethylene, propylene and higher α-olefins are described in the literature. It is common knowledge that in the polymerization of ethylene with most of these catalysts usually highly crystalline polyethylene is obtained, due to the symmetric nature of the ethylene monomer. It is, however, also common knowledge that there exists a wide difference between the polymerization of ethylene and the polymerization of α-olefins containing more than two carbon atoms, such as propylene. Polymers prepared from such monomers contain tertiary carbon atoms and the polymers are crystalline only if they are stereospecific, i.e. if the substituting groups attached to the tertiary carbon atoms of the polymer backbone chain are present in a stereospecific or stereoregular arrangement, usually referred to as an isotactic structure. The degree of crystallinity or isotactic content of such a polymer determines the properties of the polymer, i.e. the higher the crystallinity or isotactic content of the polymer, the better are the properties of the polymer, such as hardness, temperature stability and tensile strength. One type of catalyst widely used for the polymerization of α-olefins, particularly ethylene, consists of an organometallic compound, such as triethylaluminium, and a heavy metal compound, such as titanium tetrachloride (mostly called Ziegler catalysts). The use of such catalysts for stereospecific polymerization of higher α-olefins, such as propylene, has also been disclosed. However, when using previously known catalysts of said type for preparing stereospecific polymers, the crystallinity or isotactic content of the polymers formed is very low and the polymers contain a substantial amount of amorphous, oily or waxy portions. Although it is possible to mould such polymers, the mechanical and physical properties of the moulded articles are unsatisfactory for practical use. To improve the properties of the polymers the amorphous portions are separated but this is a complicated process which is very disadvantageous from an economical point of view.

It is an object of this invention, therefore, to provide an improved process for producing highly crystalline, high molecular weight stereospecific polymers of propylene and higher α-olefins.

According to the invention there is provided a process for preparing highly crystalline stereospecific olefin polymers characterized in that at least one α-olefin of the general formula

R—CH=CH₂ wherein R is selected from the group consisting of alkyl, cycloalkyl or aryl, is polymerized in the presence of a catalyst comprising as one of its components the reaction product obtained by reacting a halide of a metal selected from metals of Groups II–A and III–A of the periodic system with an organic compound of a metal selected from metals of Group I–A, the molecular ratio of the first-mentioned to the last-mentioned compound being from 1:1.5 to 1:2.5, and as the other component a halide of a metal selected from metals of Groups IV–B, V–B and VI–B, the valence of said metals being lower than the highest valence state.

The periodic system referred to is illustrated in Handbook of Chemistry and Physics, 44th edition (1962–63), The Chemical Rubber Publishing Co., Cleveland, Ohio, U.S.A.

Examples of the α-olefins which are polymerized according to the invention to produce stereospecific polymers of high isotactic content and high molecular weight include linear aliphatic olefins such as propylene, n-butene-1, n-pentene-1, n-hexene-1; branched aliphatic olefins such as 3-methylbutene-1 and 4-methyl-pentene-1; cycloaliphatic olefins such as vinylcyclohexane; and aromatic olefins such as styrene and vinylnaphthalene. The process according to the present invention is particularly useful in the stereospecific polymerization of propylene.

As mentioned hereinbefore, the first component of the catalyst used according to the present invention is a reaction product formed by reacting a halide of a metal of Groups II–A and III–A with an organic compound of a metal of Group I–A.

Of the halides of metals of Groups II–A and III–A, which are known as Friedel-Crafts catalysts, aluminium or magnesium halides are preferred, such as aluminium chloride, aluminium bromide, magnesium chloride and magnesium bromide.

The organic compounds of metals of Group I–A are compounds of for example lithium, sodium or potassium with hydrocarbon radicals containing 1 to 8 carbon atoms, such as alkyl, aryl and cycloalkyl. Examples of such organometallic compounds include ethyllithium, n-butyllithium, phenyllithium, ethylsodium, amylsodium and ethylpotassium. Of these compounds, ethyllithium and n-butyllithium are preferred as being readily obtainable and showing good reactivity.

In preparing said reaction product, being one component of the catalyst used according to the present invention, the above-mentioned materials are reacted by mixing and agitating in an inert diluent at a temperature from room temperature up to 150° C. in the absence of oxygen and moisture. As examples of inert diluents there may be mentioned hydrocarbons such as n-hexane, n-heptane, n-octane, benzene and cyclohexane, and chlorinated hydrocarbons such as chlorobenzene. The reaction is complete when the solid halides of metals of Groups II–A and III–A disappear. At this point a precipitation of white Group I–A metal halides occurs. This precipitation appears to be due to the fact that the halides of metals of Groups II–A and III–A comprise a certain amount of oxy halides which either were present in the starting material or have been formed during the handling of the material by partial decomposition in the presence of moisture. Said oxy halides obviously react with the above-mentioned organometal compounds to form said precipitate. This theory is supported by the fact that gaseous hydrocarbons are evolved during the reaction. As a final result of the reaction between the above-mentioned reactants a soluble compound is formed. The exact structure of this reaction product, being one of the components in the catalyst, is not completely understood but it appears to be a coordination compound which—when prepared from aluminum chloride and alkyllithium—is believed to be of the structure 2LiR—AlCl₃ wherein R is the alkyl radical.

As the precipitate of Group I–A metal halides formed as a side product does not directly affect the catalyst nor the polymerization reaction it is not absolutely necessary to separate said precipitated substances. Separation of the precipitate is, however, preferred as these substances otherwise would remain as ash in the polymer and thus unnecessarily affect the subsequent purification of the polymer. Moreover, they also seem to reduce the average molecular weight of the resulting polymers.

The second component of the catalyst used according to the present invention is a halide of a metal of Groups IV-B, V-B and VI-B, the valence of said metals being lower than the highest valence state. Examples of such metal halides include titanium dichloride, titanium trichloride, titanium tribromide, titanium triiodide, vanadium trichloride, vanadium oxychloride, chromyl chloride, etc. Of these, titanium compounds generally are preferred. The halides of said metals in the highest valence state generally do not yield the desired results with respect to high isotactic content of the resulting polymers. Such metal halides may, however, conveniently be used if the metal in said halides is reduced to a lower valence state, e.g., with hydrogen or aluminium, the latter process forming no part of the present invention.

The final catalyst is obtained by mixing the first component, i.e., said reaction product, with the finely divided second component or with a suspension of the finely divided second component in an inert diluent, e.g., the same diluent which was used in preparing said reaction product.

As mentioned hereinbefore, the mole ratio between the reactants used in preparing said reaction product is from 1:1.5 to 1:2.5 and a mole ratio of about 1:2 is preferred. When increasing the mole ratio above 1:2.5 the isotactic content of the resulting polymers rapidly drops from more than 90 to 75% or less. When using a mole ratio below 1:1.5 the reaction velocity of the polymerization and the polymer yield per time unit decrease. Thus, a mole ratio of 1:2 has proved optimal. With regard to the reaction described hereinbefore this value is understandable. If the second reactant is used in a substantially larger amount than that stated by the optimal mole ratio, the excess of that reactant does not participate in the reaction and reacts later with the second component of the catalyst. It is believed that these reaction products are responsible for the low isotactic content of the polymers formed.

The amount of the second component in the catalyst used according to the invention is generally not critical and the molecular ratio of the above-mentioned halide of a metal of Groups II-A and III-A to said second component may range between 0.1:1 and 10:1.

In the process according to the present invention the olefins are contacted with the above-described catalyst under the known polymerization conditions, i.e., at temperatures from 20 to 150° C. and at pressures ranging from atmospheric to 50 atmospheres above atmospheric pressure. Usually the polymerization is carried out in the presence of a diluent, although this is not necessary. The use of a diluent, however, facilitates the control of the reaction temperature. The same inert organic diluents may be used in the polymerization as in the preparation of the catalyst.

The process according to the invention permits stereospecific polymerization of the above-mentioned olefins at a substantially higher velocity than in previously known processes and stereospecific polymers of high isotactic content and high average molecular weight are obtained.

Thus the process according to the invention allows the production of stereospecific polypropylene having an isotactic content of more than 90%, the isotactic content being determined by extraction of the polymer with boiling n-heptane, assuming the insoluble portion to be a pure isotactic polymer. Usually, the isotactic content is calculated as percent by weight. Due to the high isotactic content of the polymers prepared according to the invention they may be used in manufacture without prior extraction of the atactic parts with organic solvents.

When using for example the above-mentioned previously known catalysts of Ziegler type, the polypropylene formed has a very low isotactic content of maximally 70 to 85%. These polymers cannot be used for manufacturing applications without separation of the atactic portions by extraction with organic solvents.

Purification of the polymer resulting from the polymerization reaction is effected in the conventional manner by converting the catalyst components either with anhydrous alcohol, acidic alcohol, acidic water or alkaline water (in the latter two cases wetting agents are added) to a soluble form and collecting the finely divided polymer in neutral form and practically free from ash by repeated separation and washing.

The following illustrative examples are presented to give a more comprehensive understanding of the invention and it is in no way intended to limit the scope of the invention thereto.

EXAMPLE 1

In an agitator-autoclave of 5 litres volume, which firstly had been flushed with nitrogen to remove oxygen and repeatedly evacuated, there were introduced 3 litres of cyclohexane which previously had been carefully freed from oxygen compounds, sulphur compounds, dissolved oxygen and water. At the same time there were added, through a suitable entry sluice, 10 g. of anhydrous aluminium chloride and 5 g. of ethyllithium (all substances separately enclosed in ampoules). The ampoules were crushed by a suitable device, and the substances were suspended in the cyclohexane by means of the agitator. The agitator-autoclave was then heated to about 70° C., stirring was continued for about one hour, and there was added an ampoule containing 6 g. of crystalline titanium trichloride (hydrogen-reduced, activated) and the introduction of propylene was started at about 10 atmospheres above atmospheric pressure. The occurrence of a slight exothermal heat effect and the constant tendency to falling of the pressure indicated a polymerization reaction, and during 3 hours the pressure in the autoclave was kept constant at about 10 atmospheres above atmospheric pressure by gas introduction and the temperature maintained between 70 and 80° C. Toward the end of the reaction period the tendency to pressure fall became slower and the gas feed was stopped. By reweighing of the propylene container (filled with 99.5% propylene) it was found that totally 780 g. of propylene has been introduced into the autoclave, which was relieved of pressure and the equivalent of about 50 litres at normal temperature and pressure of propylene was recovered as expansion gas. The autoclave was opened and the still readily stirrable content was transferred into a vessel containing 3 litres of ethanol and stirred for one hour at about 50° C. A white polymer powder of very small particle size was obtained which was separated from the alcohol-hydrocarbon mixture and dried. The yield amounted to 670 g. The molecular weight was 970,000 as determined by measuring the solution viscosity of a solution of 100 milligrams of the polymer in 100 cubic centimetres of "Decalin" at 135° C. and converting this value in accordance with the formula of G. V. Schulz and F. Blaschke (Journal für prakt. Chemie 158 (1941), p. 136):

$$[\eta] = \frac{\eta_{sp}}{C.(1+0.29\eta_{sp})} \text{ (100 cc./g.)}$$

and the formula of R. Chiang (J. Polym. Sci. 28 (1958) p. 235):

$$\overline{M}_w = 1.00 \cdot 10^5 \cdot [\eta]^{1.25}$$

The isotactic content was 93% as determined by exhaustive extraction of a polymer sample with boiling n-heptane under nitrogen, after stabilization against thermal decomposition.

EXAMPLE 2

Polymerization was carried out as in Example 1, except that 0.05 mole of aluminum chloride, 0.1 mole of n-butyllithium and 0.025 mole of titanium trichloride were used, suspended in benzene. The polymerization yielded 1,050 g. of polypropylene of a molecular weight of 500,000 and an isotactic content of 96%. The ash content of the polypropylene obtained after purification was about 0.1% and the yield was 87%.

EXAMPLE 3

Polymerization was carried out as in Example 1, except that 0.05 mole of magnesium chloride, 0.1 mole of ethylpotassium and 0.05 mole of titanium trichloride were used, the solid compounds being in the form of powder. The polymerization was carried out at 120° C. After 3 hours a badly stirrable suspension was obtained and after purification there resulted 540 g. of polypropylene with a molecular weight of 400,000, an isotactic content of 90% and 0.1% ash. Yield 82%.

EXAMPLE 4

Polymerization was carried out as in Example 1, except that 0.05 mole of aluminum chloride, 0.085 mole of phenyllithium and 0.05 mole of titanium trichloride were used in suspended state. After purification 740 g. of polypropylene resulted with a molecular weight of 620,000 and an isotactic content of 94%. Yield 91%.

EXAMPLE 5

Polymerization was carried out as in Example 1, except that 0.05 mole of aluminum chloride and 0.1 mole of n-butyllithium were admixed and reacted at 80° C. while stirred. The resulting reaction mixture was filtered and the filtrate was combined with 0.05 mole of titanium trichloride to prepare the polymerization catalyst. After polymerization there resulted 740 g. of polypropylene of a molecular weight of 1,020,000 and an isotactic content of 95%. The ash content was as low as 0.015% after purification of the polymer. Yield 94%.

EXAMPLE 6

Polymerization was carried out as in Example 1, except that 0.05 mole of aluminum bromide and 0.1 mole of n-butyllithium as well as 0.025 mole of titanium trichloride were used. There resulted 480 g. of polypropylene of a molecular weight of 940,000 and an isotactic content of 93%. Yield 92%.

EXAMPLE 7

Polymerization was carried out as in Example 1, except that 0.05 mole of magnesium bromide, 0.1 mole of ethylsodium and 0.01 mole of titanium dichloride were used. The polymerization was carried out at a pressure of 10 atmospheres above atmospheric pressure and at a temperature of 130° C. and after 5 hours there resulted 430 g. of polypropylene of a molecular weight of 700,000 and an isotactic content of 92%. Yield 79%.

EXAMPLE 8

Polymerization was carried out as in Example 1, except that 0.05 mole of aluminum chloride, 0.12 mole of ethyllithium and 0.05 mole of vanadium trichloride were used. There resulted 390 g. of polypropylene with a molecular weight of 270,000 and an isotactic content of 90%. Yield 85%.

EXAMPLE 9

Polymerization was carried out as in Example 1, except that 0.05 mole of aluminum chloride, 0.05 mole of ethylsodium and 0.05 mole of chromium oxychloride were used. After 7 hours there resulted 230 g. of polypropylene with a molecular weight of 410,000 and an isotactic content of 91%. Yield 84%.

EXAMPLE 10

Polymerization was carried out as in Example 1, except that 0.05 mole of aluminum chloride, 0.1 mole of n-butyllithium and 0.025 mole of titanium trichloride were used. Vinylcyclohexane was polymerized at a temperature of 70° C. and after two hours there resulted 430 g. of polyvinylcyclohexane with an isotactic content of more than 90%. Yield 85%.

EXAMPLE 11

Polymerization was carried out as in Example 1, except that 0.05 mole of aluminum chloride, 0.1 mole of n-butyllithium and 0.05 mole of titanium trichloride were used. Styrene was polymerized at 8 atmospheres above atmospheric pressure and at a temperature of 50° C. After 4 hours there resulted 270 g. of polystyrene with an isotactic content of more than 90%. Yield 87%.

EXAMPLE 12

Into a 750 litre agitator-autoclave there were introduced continuously via metering piston pumps 180 litres per hour of solvent-naphtha (boiling range 80–115° C.) and 18 g. per hour of titanium trichloride (hydrogen-activated) in the form of a suspension in the same diluent with a concentration of 100 g. per litre. Simultaneously, via the same metering piston pump, there was introduced the filtered reaction product of 36 g. of aluminum chloride and 18 g. of ethyllithium, per hour. At the same time, the pressure in the agitator-autoclave was kept constant by the introduction of propylene at 8 atmospheres above atmospheric pressure and at a temperature of 75° C. After 3 hours a polymer had formed and the polymer solution was withdrawn by overflow. The polymer was present in the solution at a concentration of 280 g. per litre and the polymer solution was easily stirrable and capable of flowing. This run was continued during totally 5 days without substantial disturbances. There resulted a polypropylene with an average molecular weight of 630,000 and an isotactic content of 92%. The total polymer amount obtained after purification was 5.5 tons. This corresponds to a yield of 96%. The ash content of the polymer amounted to less than 0.02%.

EXAMPLE 13

Polymerization was carried out as in Example 1, except that 0.05 mole of aluminum chloride, 0.15 mole of n-butyllithium and 0.05 mole of titanium trichloride were used. After 2 hours there resulted a viscous polymer solution containing 430 g. of polypropylene with an isotactic content of 72%. The yield amounted to 82% and the molecular weight was 430,000.

EXAMPLE 14

Polymerization was carried out as in Example 1, except that 0.05 mole of aluminum chloride, 0.06 mole of ethyllithium and 0.025 mole of titanium trichloride were used. The polymerization took place very slowly, and after 6 hours there were obtained 270 g. of polypropylene with an isotactic content of 82%. The yield amounted to 78% and the molecular weight was 640,000.

For comparison purposes the following runs were carried out:

Run No. 1

Polymerization was carried out as in Example 1, except that a catalyst was prepared by introducing the catalyst starting compounds simultaneously and together into the reactor. The resulting catalyst mixture was used for polymerization and after 2 hours there resulted a viscous polymer solution containing 320 g. of polypropylene with an isotactic content of 68%. The yield amounted to 83% and the molecular weight was 530,000.

This run shows that when using a catalyst not prepared according to the invention, although the catalyst comprises the same starting compounds, the polymer formed will have a substantially lower isotactic content than when using the catalyst prepared according to the invention.

Run No. 2

Polymerization was carried out as in Example 1, except that instead of titanium trichloride an equal amount of titanium tetrachloride was used in preparing the catalyst. After 3 hours there resulted a viscous polymer solution containing 280 g. of polypropylene with an isotactic content of 54%. The yield amounted to 75% and the molecular weight was 370,000.

This run shows that when the metal halide being the second component of the catalyst is of the highest valence state, such as titanium tetrachloride, the polymer formed will have a substantially lower isotactic content than if said metal halides are of a lower valence state, as in the examples hereinbefore.

I claim:
1. A process of preparing highly crystalline stereospecific olefin polymers characterized in that at least one α-olefin of the general formula

$$R-CH=CH_2$$

wherein R is selected from the group consisting of alkyl, cycloalkyl and aryl, is polymerized in the presence of a catalyst comprising as the first of its components the reaction product obtained by reacting a halide of a metal selected from the group consisting of the metals of Groups II-A and III-A of the Periodic System with an organometallic compound of a metal of Group I-A, the molecular ratio of said metal halide to said organometallic compound being from 1:1.5 to 1:2.5, and as the second component a halide of a metal selected from the group consisting of the metals of Groups IV-B, V-B and VI-B, the valence of said metals being lower than the highest valence state.

2. The process of claim 1, characterized in that said α-olefin is propylene.

3. The process of claim 1, characterized in that the metal halide used in preparing said first component is aluminum chloride.

4. The process of claim 1, characterized in that the metal halide used in preparing said first component is magnesium chloride.

5. The process of claim 1, characterized in that the organometallic compound used in preparing said first component is alkyllithium.

6. The process of claim 1, characterized in that the organometallic compound used in preparing said first component is aryllithium.

7. The process of claim 1, characterized in that the organometallic compound used in preparing said first component is a sodium compound.

8. The process of claim 1, characterized in that the organometallic compound used in preparing said first component is a potassium compound.

9. The process of claim 1, characterized in that said second component is titanium trichloride.

10. The process of claim 1, characterized in that said second component is vanadium trichloride.

11. The process of claim 1, effected in a hydrocarbon diluent.

References Cited by the Examiner
UNITED STATES PATENTS

| | | | |
|---|---|---|---|
| 2,881,156 | 4/1959 | Pilar et al. | 260—94.9 |
| 3,007,907 | 11/1961 | Robinson et al. | 260—94.9 |
| 3,075,958 | 1/1963 | Kastning et al. | 260—94.9 |

FOREIGN PATENTS 865,317  4/1961  Great Britain.

JOSEPH L. SCHOFER, *Primary Examiner.*

E. M. OLSTEIN, M. B. KURTZMAN,
*Assistant Examiners.*